(12) United States Patent
Jorgenson

(10) Patent No.: US 7,082,710 B1
(45) Date of Patent: Aug. 1, 2006

(54) DECOY SUPPORT SYSTEM

(76) Inventor: Marty L. Jorgenson, 234 14th Ave. SE., #110, Minot, ND (US) 58701

( * ) Notice: Subject to any disclaimer, the term of this patent is extended or adjusted under 35 U.S.C. 154(b) by 74 days.

(21) Appl. No.: 10/921,024

(22) Filed: Aug. 17, 2004

(51) Int. Cl.
A01M 31/06 (2006.01)
(52) U.S. Cl. .................................. 43/2; 43/3
(58) Field of Classification Search ................ 43/2, 43/3; 40/411, 414, 415, 417; 446/330, 353, 446/358
See application file for complete search history.

(56) References Cited

U.S. PATENT DOCUMENTS

| 636,106 | A | * | 10/1899 | Biddle .................. 43/3 |
|---|---|---|---|---|
| 2,229,175 | A | * | 1/1941 | Johnson ................. 43/3 |
| 2,480,390 | A | * | 8/1949 | Thompson ............... 43/3 |
| 2,704,416 | A | * | 3/1955 | Laird ................... 43/3 |
| 2,849,823 | A | * | 9/1958 | Miller .................. 43/3 |
| 2,885,813 | A | * | 5/1959 | Kratzert ................ 43/3 |
| 3,245,168 | A | * | 4/1966 | Pool .................... 43/3 |
| 3,350,808 | A | * | 11/1967 | Mitchell ................ 43/3 |
| 3,401,476 | A | * | 9/1968 | Trumbo ................. 43/3 |
| 4,056,890 | A | * | 11/1977 | Dembski ................ 43/3 |
| 4,314,423 | A | * | 2/1982 | Lipsitz et al. .......... 43/3 |
| 4,322,908 | A | | 4/1982 | McCrory ................ 43/3 |
| 4,600,399 | A | * | 7/1986 | Abe .................. 40/414 |
| 4,845,873 | A | * | 7/1989 | Hazlett ................. 43/3 |
| 4,867,730 | A | * | 9/1989 | Lee .................. 446/353 |
| 4,869,703 | A | * | 9/1989 | Ong S.T. ............. 446/353 |
| 4,885,861 | A | * | 12/1989 | Gazalski ............... 43/3 |
| 4,890,408 | A | | 1/1990 | Heiges et al. .......... 43/3 |
| 4,896,448 | A | * | 1/1990 | Jackson ................ 43/3 |
| 5,036,614 | A | | 8/1991 | Jackson ................ 43/3 |
| 5,168,649 | A | * | 12/1992 | Wright ................. 43/2 |
| 5,172,506 | A | * | 12/1992 | Tiley et al. ........... 43/3 |
| 5,233,780 | A | * | 8/1993 | Overholt ............... 43/2 |
| 5,274,942 | A | * | 1/1994 | Lanius ................. 43/2 |
| 5,289,654 | A | * | 3/1994 | Denny et al. ........... 43/2 |
| 5,392,554 | A | * | 2/1995 | Farstad et al. ......... 43/3 |
| 5,459,958 | A | * | 10/1995 | Reinke ................. 43/2 |
| 5,515,637 | A | * | 5/1996 | Johnson ................ 43/2 |
| 5,775,022 | A | * | 7/1998 | Sumrall et al. ......... 43/3 |
| 5,809,683 | A | * | 9/1998 | Solomon ................ 43/3 |
| 5,826,364 | A | * | 10/1998 | Bitting ................ 43/2 |
| 5,876,263 | A | * | 3/1999 | DeCesare et al. ..... 446/330 |
| 5,926,990 | A | * | 7/1999 | Okimoto ............... 43/2 |
| 5,943,807 | A | * | 8/1999 | McPherson ............. 43/2 |
| 5,960,577 | A | * | 10/1999 | Walterson ............. 43/3 |
| 6,070,356 | A | | 6/2000 | Brint et al. .......... 43/2 |
| 6,079,140 | A | | 6/2000 | Brock, IV ............. 43/3 |
| 6,082,036 | A | * | 7/2000 | Cripe .................. 43/3 |
| 6,212,816 | B1 | * | 4/2001 | Babbitt et al. ......... 43/3 |

(Continued)

FOREIGN PATENT DOCUMENTS

EP        1179296 A2 *  2/2002

(Continued)

OTHER PUBLICATIONS

Look-Alive! Rick Lake Products, Inc. Wildfowl Magazine 1 Page.

Primary Examiner—Darren W. Ark

(57) ABSTRACT

A decoy support system for providing animation to existing conventional decoys. The decoy support system includes a housing, a motor, and a mounting bracket pivotally attached to the housing for supporting a decoy in a movable manner. The mounting bracket is mechanically connected to the motor for pivoting the mounting bracket with respect to the housing. The housing is attachable in various positions such as the ground, trees and the like.

7 Claims, 9 Drawing Sheets

U.S. PATENT DOCUMENTS

| | | | |
|---|---|---|---|
| 6,266,912 B1 * | 7/2001 | Jirele | 43/2 |
| 6,339,893 B1 * | 1/2002 | Solomon | 43/3 |
| 6,350,170 B1 * | 2/2002 | Liu | 446/353 |
| 6,360,474 B1 * | 3/2002 | Wurlitzer | 43/3 |
| 6,413,594 B1 * | 7/2002 | Onishi | 40/414 |
| 6,463,690 B1 | 10/2002 | Wood et al. | 43/2 |
| 6,493,980 B1 * | 12/2002 | Richardson et al. | 43/3 |
| 6,574,903 B1 * | 6/2003 | Solomon | 43/3 |
| 6,591,539 B1 * | 7/2003 | Cosciani | 43/2 |
| 6,708,440 B1 * | 3/2004 | Summers et al. | 43/2 |
| 6,834,458 B1 * | 12/2004 | Hand et al. | 43/3 |
| 6,901,693 B1 * | 6/2005 | Crowe | 43/2 |
| 2003/0019142 A1 * | 1/2003 | Cosciani | 43/2 |
| 2004/0025399 A1 * | 2/2004 | Donnigan et al. | 43/2 |
| 2005/0160654 A1 * | 7/2005 | Cosciani | 43/2 |

FOREIGN PATENT DOCUMENTS

| | | | | |
|---|---|---|---|---|
| EP | 1279333 A2 * | 1/2003 | | |
| GB | 2188851 A * | 10/1987 | | 446/353 |
| GB | 2295953 A * | 6/1996 | | |
| GB | 2412560 A * | 10/2005 | | |
| WO | WO-03/059058 A1 * | 7/2003 | | |

* cited by examiner

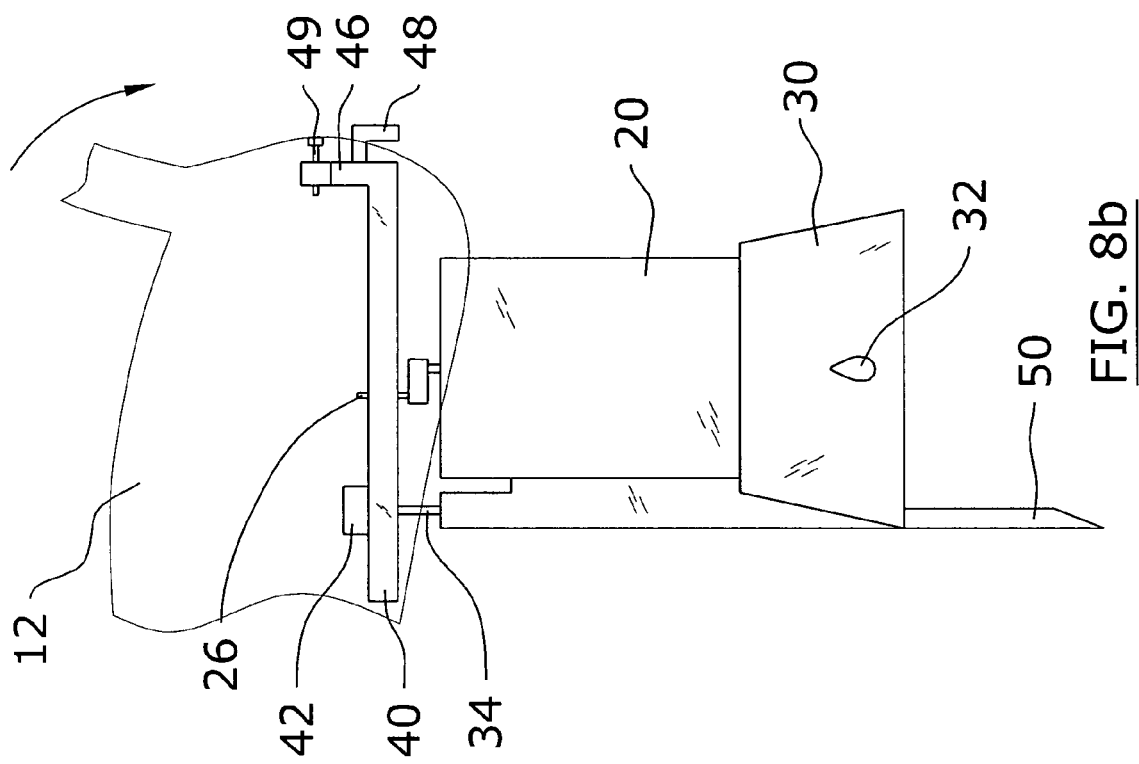
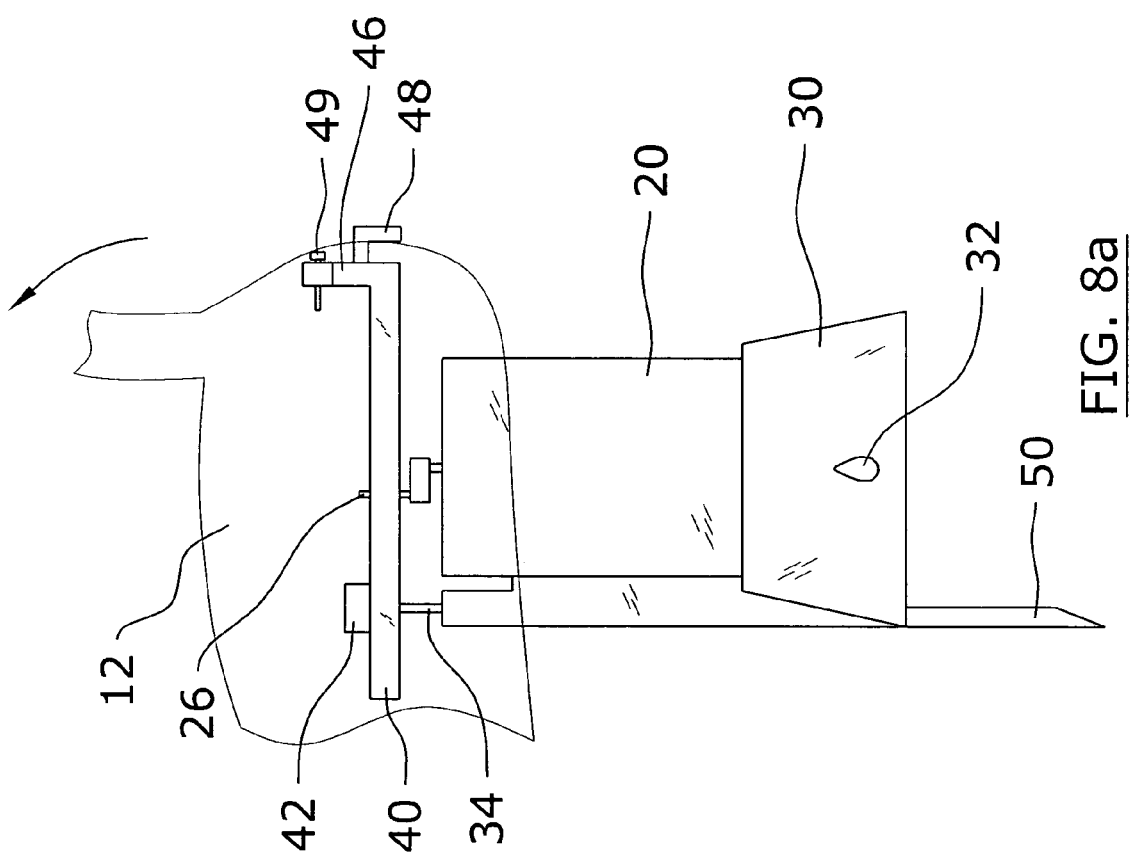

DECOY SUPPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to decoy stands and more specifically it relates to a decoy support system for providing animation to existing conventional decoys.

2. Description of the Related Art

Decoys have been in use for years. Conventional decoys are typically in the shape of the animal attempted to be decoyed in (e.g. geese, ducks, squirrels, etc.). A commonly utilized decoy is the goose shell decoy which is basically a hollow shell structure in the shape and design of a goose. More recently, animated decoys (powered by the wind or motors) have been developed that assist in creating lifelike movements of the decoys.

One of the main problems with conventional stationary decoys is that they do not provide as an effective decoying system for attracting animals as animated/motorized decoys. One of the main problems with motorized decoys is that they are relatively expensive and cannot be utilized in various different situations, much less with existing decoys.

While these devices may be suitable for the particular purpose to which they address, they are not as suitable for providing animation to existing conventional decoys. Conventional stationary decoys do not provide as effective decoying of animals as animated decoys and animated decoys are only designed for a single application.

In these respects, the decoy support system according to the present invention substantially departs from the conventional concepts and designs of the prior art, and in so doing provides an apparatus primarily developed for the purpose of providing animation to existing conventional decoys.

BRIEF SUMMARY OF THE INVENTION

In view of the foregoing disadvantages inherent in the known types of decoys now present in the prior art, the present invention provides a new decoy support system construction wherein the same can be utilized for providing animation to existing conventional decoys.

The general purpose of the present invention, which will be described subsequently in greater detail, is to provide a new decoy support system that has many of the advantages of the decoys mentioned heretofore and many novel features that result in a new decoy support system which is not anticipated, rendered obvious, suggested, or even implied by any of the prior art decoys, either alone or in any combination thereof.

To attain this, the present invention generally comprises a housing, a motor, and a mounting bracket pivotally attached to the housing for supporting a decoy in a movable manner. The mounting bracket is mechanically connected to the motor for pivoting the mounting bracket with respect to the housing. The housing is attachable in various positions such as the ground, trees and the like.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a decoy support system that will overcome the shortcomings of the prior art devices.

A second object is to provide a decoy support system for providing animation to existing conventional decoys, lawn ornaments and other objects.

Another object is to provide a decoy support system that requires only minor modification to existing decoys.

An additional object is to provide a decoy support system that may be mounted in various positions.

A further object is to provide a decoy support system that is remotely controlled by a hunter.

Another object is to provide a decoy support system that is capable of providing both animation and sound to decoy animals.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 7a is a top view of the present invention with the mounting bracket in the.

FIG. 8a is a side view illustrating the decoy in the raised position.

FIG. 8b is a side view illustrating the decoy in the lowered position.

DETAILED DESCRIPTION OF THE INVENTION

A. Overview

Figure 1:
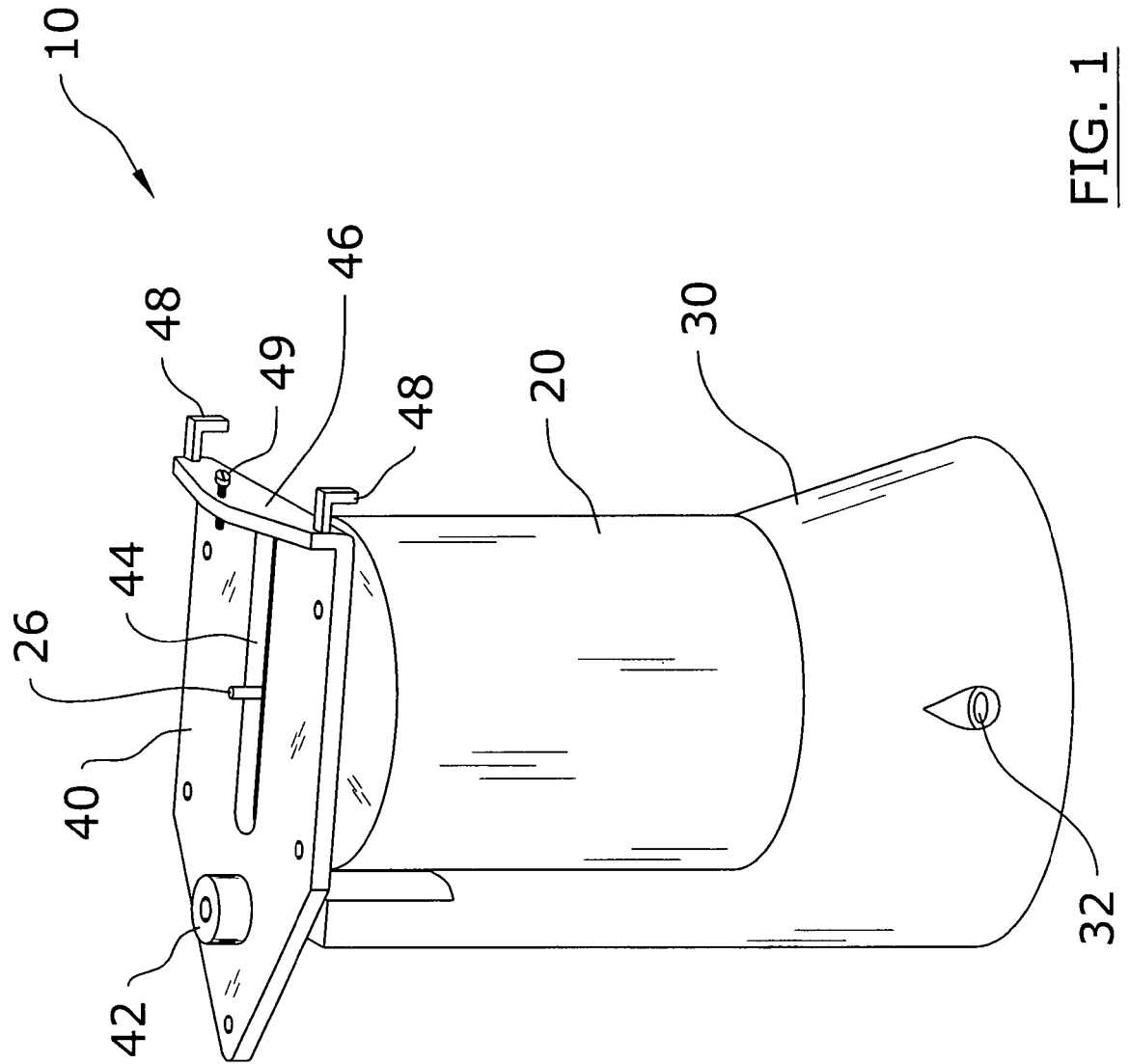
FIG. 1 is an upper perspective view of the present invention.

Turning now descriptively to the drawings, in which similar reference characters denote similar elements throughout the several views, FIGS. 1 through 9 illustrate a decoy support system 10, which comprises a housing 30, a motor 20, and a mounting bracket 40 pivotally attached to the housing 30 for supporting a decoy 12 in a movable manner. The mounting bracket 40 is mechanically connected to the motor 20 for pivoting the mounting bracket 40 with respect to the housing 30. The housing 30 is attachable in various positions such as the ground, trees and the like.

B. Housing

FIGS. 1 through 6 illustrate an exemplary housing 30 for the present invention. The housing 30 may have various shapes and structures. For example, the housing 30 may be shaped and colored similar to a tree stump or other natural item. The housing 30 preferably includes a plurality of fastener apertures 32 for receiving fasteners thereby allowing securing to objects such as trees, walls and the like.

Figure 4:
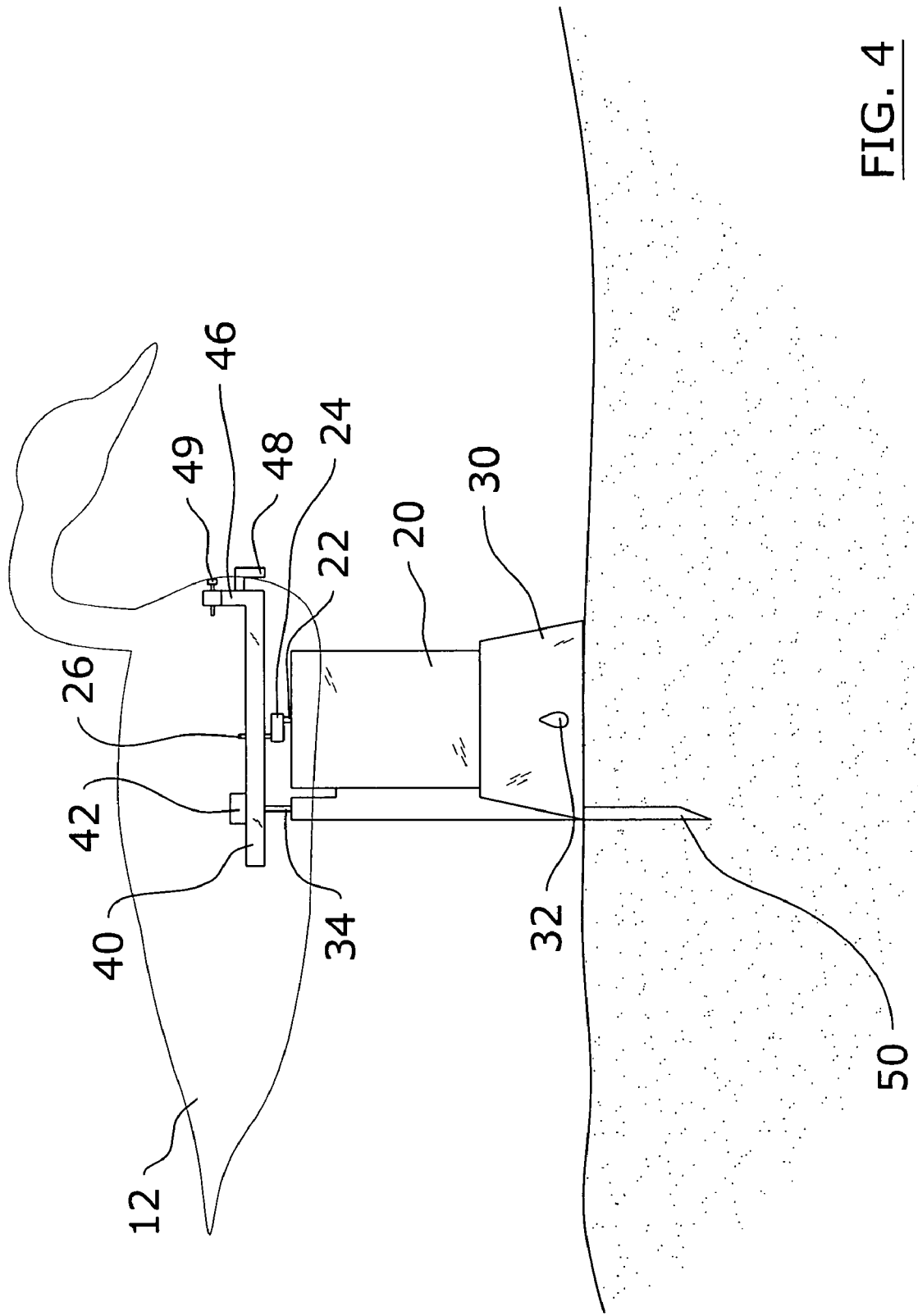
FIG. 4 is a side view of the present invention supporting a decoy comprised of a goose shell.
Figure 6:
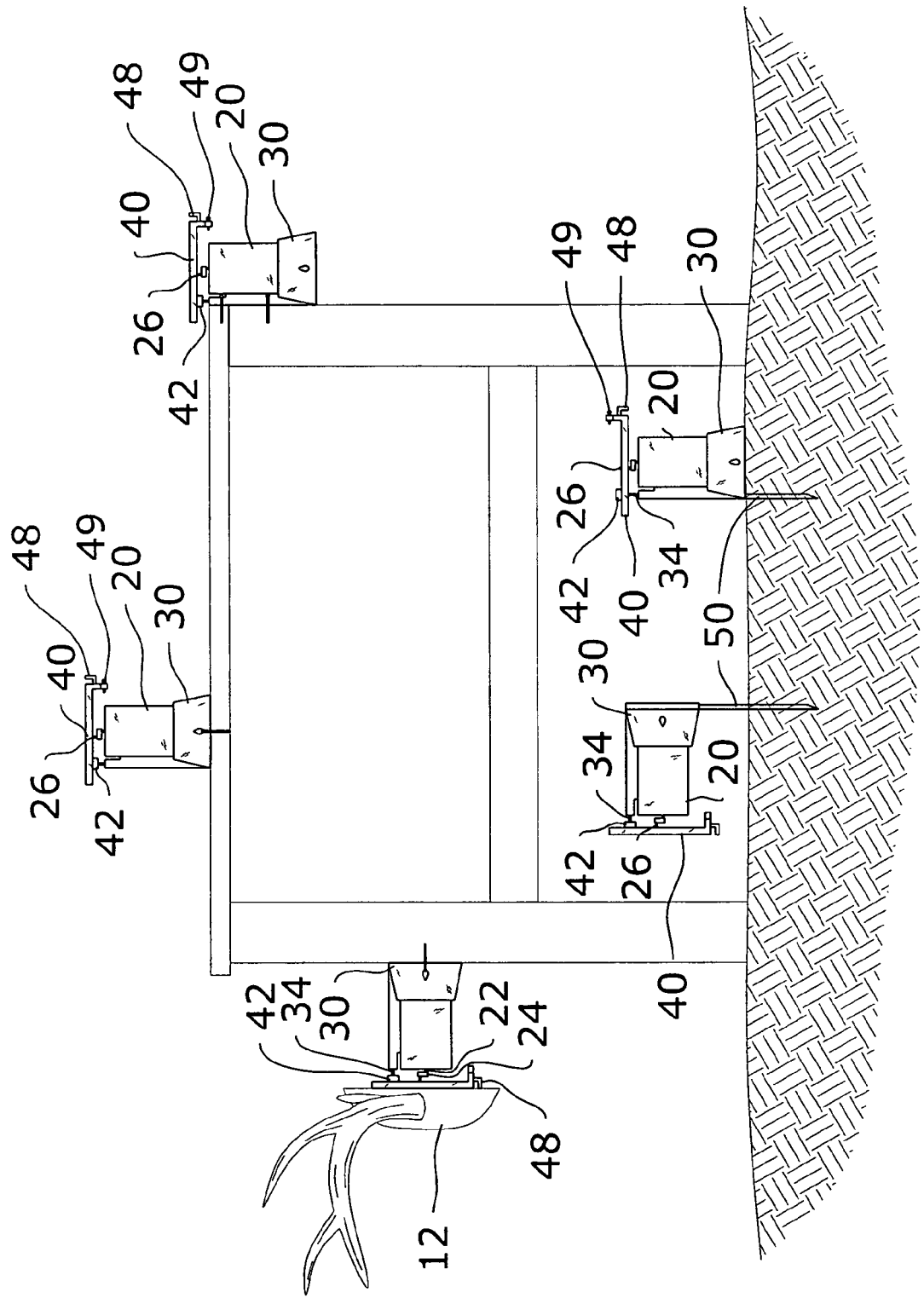
FIG. 6 is a side view illustrating a plurality of different positions for the present invention.
Figure 7B:
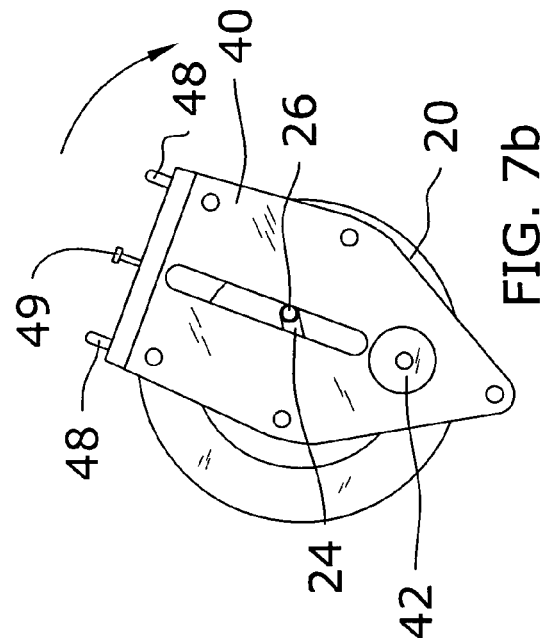
FIG. 7b is a top view illustrating the mounting bracket pivoting to the right in the right position.
Figure 7D:
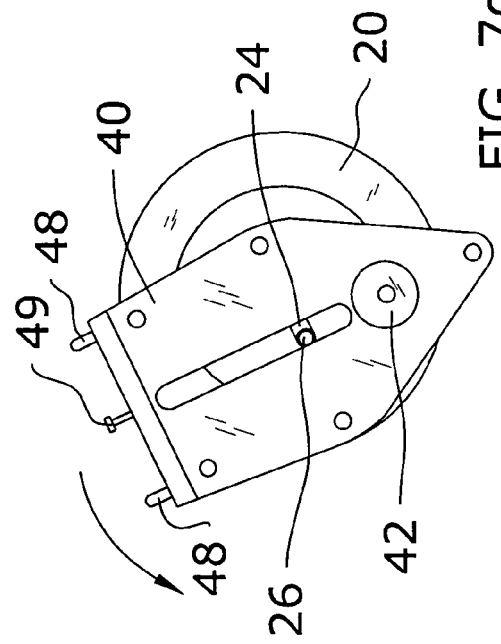
FIG. 7d is a top view illustrating the mounting bracket pivoting to the left in the left position.
Figure 7A:
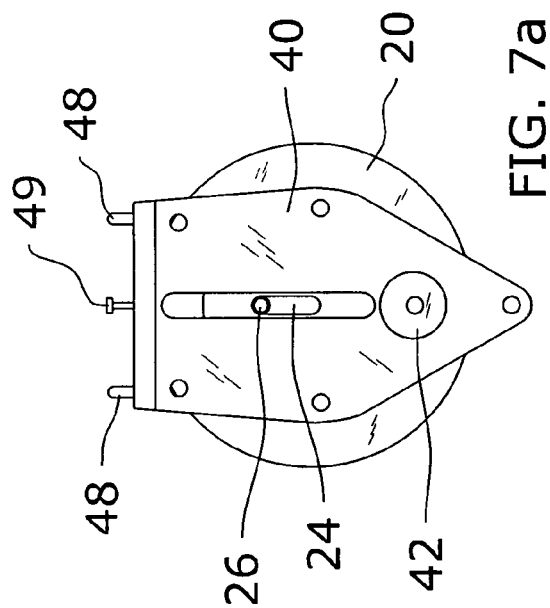
Figure 7C:
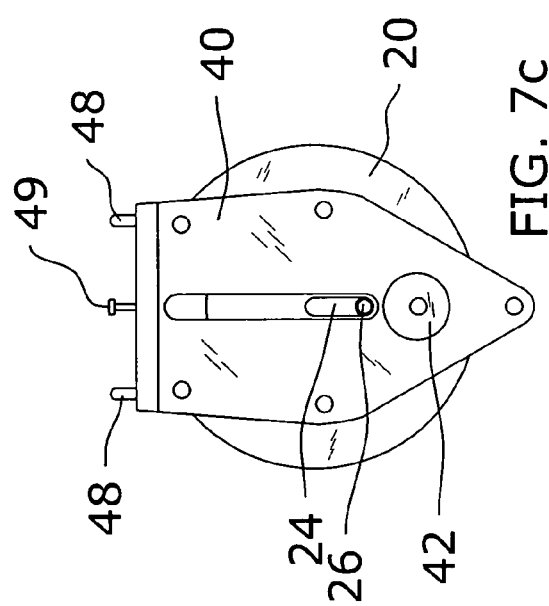
FIG. 7c is a top view illustrating the mounting bracket pivoting to the left in the center position.

The housing 30 is preferably capable of receiving a spike 50 as shown in FIGS. 4 and 6 of the drawings. The spike 50 is preferably adjustably positionable within one or more channels within the housing 30 for adjusting the height of the housing 30 with respect to the spike 50. The spike 50 is also repositionable within various locations within the housing 30 to allow for the arrangement of the housing 30 in a vertical or horizontal manner as shown in FIG. 6 of the drawings.

Figure 2:
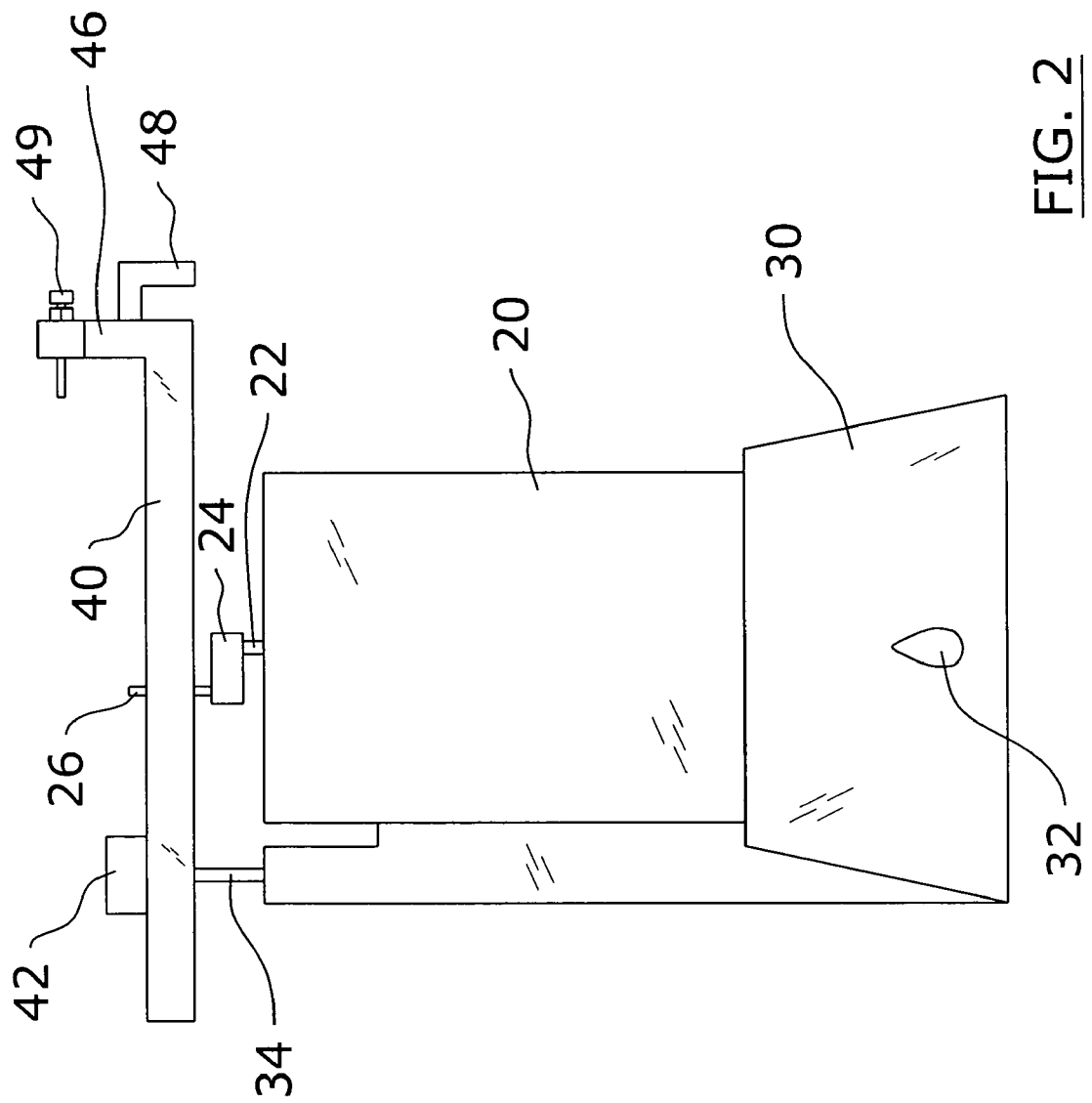
FIG. 2 is a side view of the present invention.
Figure 3:
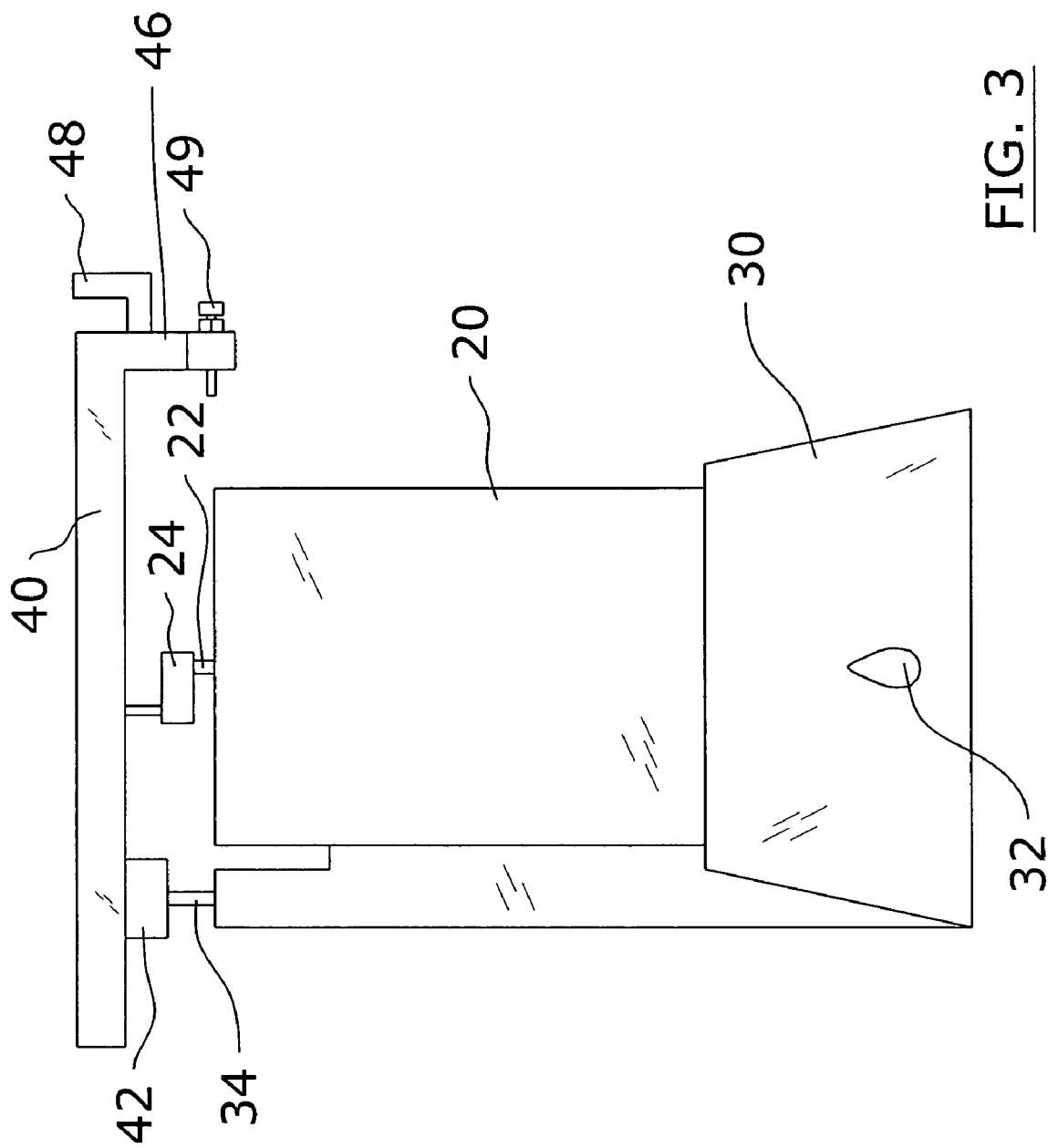
FIG. 3 is a side view of the present invention with the mounting bracket inverted.

A pivot shaft 34 extends from the housing 30 as illustrated in FIGS. 2 through 4 of the drawings. The pivot shaft 34 pivotally receives the rear end of the mounting bracket 40 as further shown in FIGS. 2 through 4 of the drawings.

C. Motor

The motor 20 is attached to the housing 30 for reciprocating the mounting bracket 40. The motor 20 may be comprised of various types of motors 20 capable of slowly rotating the drive shaft 22. The motor 20 includes a drive shaft 22, a link member 24 attached to the drive shaft 22 in a radial manner and an extended shaft 26 extending from the link member 24 offset from a longitudinal axis of the drive shaft 22 as best shown in FIG. 2 of the drawings. The extended shaft is connected to the mounting bracket 40 for pivoting the mounting bracket 40 upon the pivot shaft 34.

D. Mounting Bracket

The mounting bracket 40 has a rear end pivotally attached to the pivot shaft 34 of the housing 30. The mounting bracket 40 is formed for supporting a decoy 12 in a pivotal manner upon the housing 30. The mounting bracket 40 is mechanically connected to the motor 20 for pivoting the mounting bracket 40 with respect to the housing 30 in a reciprocating manner.

The mounting bracket 40 includes a receiver 62 member 42 with an aperture for receiving the pivot shaft 34 as shown in FIGS. 1 through 4 of the drawings. The mounting bracket 40 includes an elongated and straight guide slot 44 that slidably receives the extended member as shown in FIGS. 7a through 7d of the drawings. The guide slot 44 is preferably parallel to a longitudinal axis of the mounting bracket 40 as further shown in FIGS. 7a through 7d of the drawings.

The mounting bracket 40 includes a front member 46 and a plurality of front hooks 48 extending from the front member 46 for engaging the front portion of the decoy 12 as shown in FIGS. 1 through 4 of the drawings. A threaded adjustment member 49 is adjustably extending from the front member 46 for adjustably supporting a decoy 12.

E. Control Unit

Figure 9:
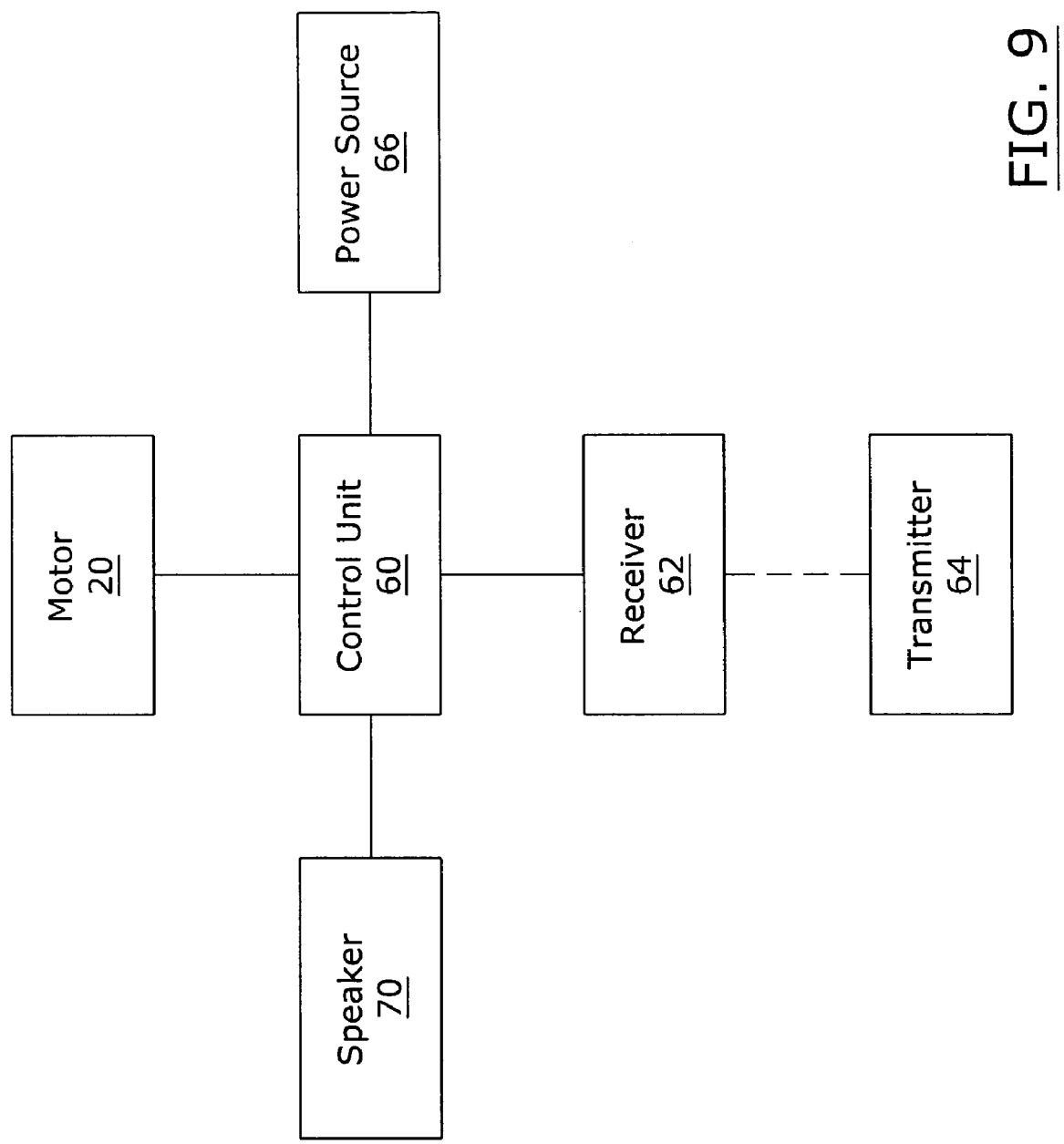
FIG. 9 is a block diagram of the present invention.

A control unit 60 is in communication with the motor 20 for controlling the motor 20 (e.g. power on/off to motor 20, rotational speed of motor 20, etc.). A receiver 62 is preferably in communication with the control unit 60 and a transmitter 64 is in remote communication with the receiver 62 as shown in FIG. 9 of the drawings. A portable power source 66 is preferably in electrical communication with the control unit 60 for providing electrical power to the control unit 60, motor 20 and the like. A speaker 70 may be in communication with the control unit 60 for emitting various types of pre-recorded sounds (e.g. animal sounds, etc.).

F. Operation of Invention

In the main embodiment, the user forms a plurality of apertures within the front portion of the decoy 12 that correspond to the front hooks 48 of the mounting bracket 40. The user extends the front hooks 48 of the mounting bracket 40 into the apertures and then adjusts the adjustment member 49 to provide the desired tilt for the decoy 12 (FIG. 8a illustrates a relatively level decoy 12 and FIG. 8b illustrates a forwardly tilted decoy 12). The adjustment member 49 engages the interior surface of the shell of the decoy 12 and the outer ends of the front hooks 48 engage the exterior surface of the shell of the decoy 12 thereby retaining the decoy 12 in a desired position upon the mounting bracket 40. The mounting bracket 40 is then pivotally positioned upon the housing 30 as shown in FIG. 4 of the drawings. When the user wants the decoy 12 to be animated, the user simply presses a button on the transmitter 64 which sends a signal to the receiver 62. The receiver 62 communicates to the control unit 60 and the control unit 60 then activates the motor 20 which reciprocates the mounting bracket 40 (and hence the decoy 12) as shown in FIGS. 7a through 7d of the drawings. When the user wants the reciprocating motion to terminate, the user presses a button on the transmitter 64 to communicate to the control unit 60 that the motor 20 should be terminated. This process may continue as desired by the user.

Figure 5:
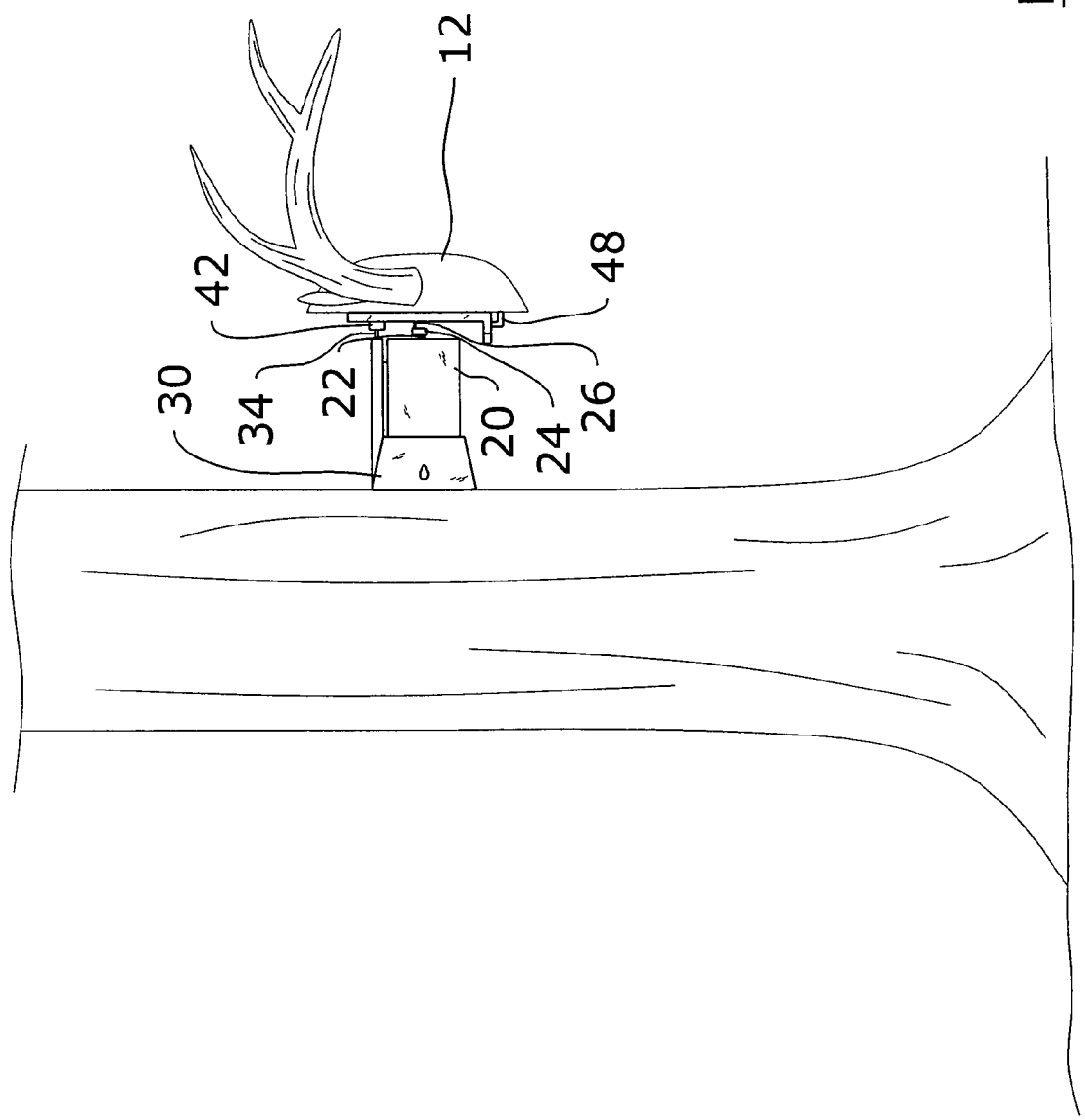
FIG. 5 is a side view of the present invention supporting a decoy comprised of an antler structure.

FIG. 5 illustrates an alternative mounting arrangement where the mounting bracket 40 is reversed and providing a flat surface for mounting an object (e.g. antlers, etc.) upon. The object may be mounted using fasteners such as but not limited to hook and loop fasteners, screws and the like.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:
1. A decoy support system, comprising:
a housing;
a spike removably positioned within said housing, wherein said spike is adjustably positionable within said housing;
a motor attached to said housing; and
a mounting bracket having a rear end pivotally attached to said housing for supporting a decoy in a pivotal manner and wherein said mounting bracket is mechanically connected to said motor for pivoting said mounting bracket with respect to said housing in a reciprocating manner;
a pivot shaft extending from said housing and pivotally receiving said rear end of said mounting bracket;
wherein said mounting bracket includes a receiver member with an aperture for receiving said pivot shaft;
wherein said motor includes a drive shaft;
a link member attached to said drive shaft in a radial manner;
an extended shaft extending from said link member offset from a longitudinal axis of said drive shaft;
wherein said extended shaft is connected to said mounting bracket;
wherein said mounting bracket includes a guide slot that slidably receives said extended shaft;
wherein said guide slot is elongated and is parallel to a longitudinal axis of said mounting bracket;
wherein said mounting bracket includes a front member and a plurality of front hooks extending from said front member;
an adjustment member adjustably extending from said front member for adjustably supporting a decoy;
a control unit in communication with said motor for controlling said motor;
a receiver in communication with said control unit and a transmitter in remote communication with said receiver;
a portable power source in electrical communication with said control unit.

2. The decoy support system of claim 1, wherein said housing includes a plurality of fastener apertures for receiving fasteners.

3. The decoy support system of claim 1, including a speaker in communication with said control unit.

4. A decoy support system, comprising:
a housing;
a spike removably positioned within said housing, wherein said spike is adjustably positionable within said housing;
a motor attached to said housing; and
a mounting bracket having a rear end pivotally attached to said housing, wherein said mounting bracket is mechanically connected to said motor for pivoting said mounting bracket with respect to said housing in a reciprocating manner;
wherein a front end of said mounting bracket reciprocates from side to side because of said motor;
a decoy mounted to said mounting bracket;
a pivot shaft extending from said housing and pivotally receiving said rear end of said mounting bracket;
wherein said mounting bracket includes a receiver member with an aperture for receiving said pivot shaft;
wherein said motor includes a drive shaft;
a link member attached to said drive shaft in a radial manner;
an extended shaft extending from said link member offset from a longitudinal axis of said drive shaft;
wherein said extended shaft is connected to said mounting bracket;
wherein said mounting bracket includes a guide slot that slidably receives said extended shaft;
wherein said guide slot is elongated and is parallel to a longitudinal axis of said mounting bracket;
wherein said extended shaft extends through said guide slot in a transverse manner;
wherein said mounting bracket includes a front member and a plurality of front hooks extending from said front member;
wherein said plurality of front hooks each have a horizontal portion extending forwardly from said front member and a vertical portion extending downwardly from said horizontal portion;
an adjustment member adjustably extending from said front member for adjustably supporting a decoy, wherein said adjustment member is threadably connected to said front member in an adjustable manner;
wherein said adjustment member is positioned between at least two of said plurality of front hooks;
a control unit in communication with said motor for controlling said motor;
a receiver in communication with said control unit and a transmitter in remote communication with said receiver;
a portable power source in electrical communication with said control unit.

5. The decoy support system of claim 4, wherein said housing includes a plurality of fastener apertures for receiving fasteners.

6. The decoy support system of claim 4, including a speaker in communication with said control unit.

7. A decoy support system, comprising:
a housing;
a spike removably positioned within said housing, wherein said spike is adjustably positionable within said housing;
a motor attached to said housing; and
a mounting bracket having a rear end pivotally attached to said housing, wherein said mounting bracket is mechanically connected to said motor for pivoting said mounting bracket with respect to said housing in a reciprocating manner;
wherein a front end of said mounting bracket reciprocates from side to side because of said motor;
a decoy mounted to said mounting bracket;
a pivot shaft extending from said housing and pivotally receiving said rear end of said mounting bracket;
wherein said mounting bracket includes a receiver member with an aperture for receiving said pivot shaft;
wherein said motor includes a drive shaft;
a link member attached to said drive shaft in a radial manner;
an extended shaft extending from said link member offset from a longitudinal axis of said drive shaft;
wherein said extended shaft is connected to said mounting bracket;
wherein said mounting bracket includes a guide slot that slidably receives said extended shaft;
wherein said guide slot is elongated and is parallel to a longitudinal axis of said mounting bracket;

wherein said extended shaft extends through said guide slot in a transverse manner;

wherein said mounting bracket includes a front member and a plurality of front hooks extending from said front member;

wherein said plurality of front hooks each have a horizontal portion extending forwardly from said front member and a vertical portion extending downwardly from said horizontal portion;

an adjustment member adjustably extending from said front member for adjustably supporting a decoy, wherein said adjustment member is threadably connected to said front member in an adjustable manner;

wherein said adjustment member is positioned between at least two of said plurality of front hooks;

a control unit in communication with said motor for controlling said motor;

a receiver in communication with said control unit and a transmitter in remote communication with said receiver;

wherein said housing includes a plurality of fastener apertures for receiving fasteners, wherein said plurality of fastener apertures extend substantially parallel to said extended shaft;

a portable power source in electrical communication with said control unit; and a speaker in communication with said control unit.

* * * * *